United States Patent [19]
Jennings et al.

[11] Patent Number: 5,367,865
[45] Date of Patent: Nov. 29, 1994

[54] ROUND BALER APRON TENSIONING APPARATUS

[75] Inventors: Richard E. Jennings, Manheim; James T. Clevenger, Jr., Lancaster, both of Pa.

[73] Assignee: Ford New Holland, Inc., New Holland, Pa.

[21] Appl. No.: 105,570

[22] Filed: Aug. 13, 1993

[51] Int. Cl.⁵ .......................................... A01D 39/00
[52] U.S. Cl. ......................................................... 56/341
[58] Field of Search ................... 56/341, 342, 343, 344; 100/76, 87, 88

[56] References Cited

U.S. PATENT DOCUMENTS

| | | | |
|---|---|---|---|
| 4,280,320 | 7/1981 | Eggers | 56/341 |
| 4,391,187 | 5/1983 | Koning et al. | 100/88 |
| 4,414,888 | 11/1983 | Campbell et al. | 56/341 X |
| 4,417,436 | 11/1983 | Campbell | 56/341 |
| 4,425,753 | 1/1984 | Freimuth | 56/341 |
| 4,656,820 | 4/1987 | Jennings | 56/341 |
| 4,698,955 | 10/1987 | Wagstaff | 56/341 |
| 4,748,801 | 6/1988 | Sheehan et al. | 56/341 |
| 4,870,812 | 10/1989 | Jennings et al. | 56/341 |
| 4,899,651 | 2/1990 | Lausch et al. | 100/87 |

Primary Examiner—Michael Powell Buiz
Attorney, Agent, or Firm—Frank A. Seemar; Larry W. Miller

[57] ABSTRACT

A round baler having a main frame, a tailgate pivotally connected to the main frame and an apron extending around a plurality of guide rolls disposed in the main frame and the tailgate. A pair of take up arms, rotatably mounted on the main frame, carry at least one additional guide roll for the apron. The apron defines a bale forming chamber which varies in size from a bale starting position to a full bale position under conditions where crop material is conveyed thereto. A pair of levers, connected to rotate with the take up arms as the girth of the bale being formed increases, are attached to a tensioning mechanism to urge the take up arms to the bale starting position of the apron. The tensioning mechanism includes a spring and a hydraulic cylinder mounted in tandem on one side of the baler and a spring on the other side of the baler.

10 Claims, 3 Drawing Sheets

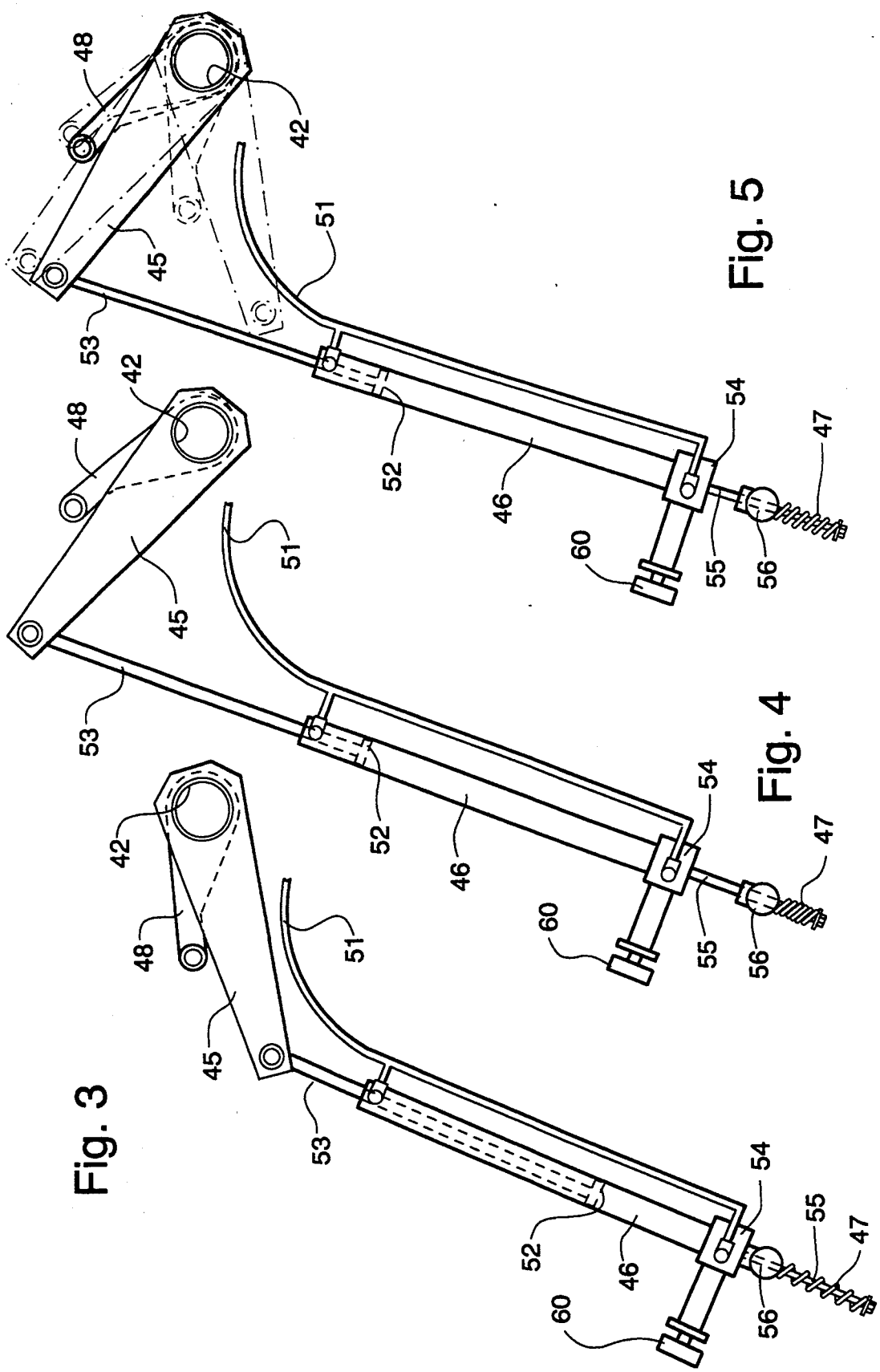

ROUND BALER APRON TENSIONING APPARATUS

FIELD OF THE INVENTION

The present invention relates generally to round balers and more particularly to an improved system for providing tension to the apron.

BACKGROUND OF THE INVENTION

It is common for round balers to have an expandable bale forming chamber between opposing vertical sidewalls. Cooperating transverse chamber walls are defined by a continuous apron and/or a plurality of rolls. Frequently the apron consists of an array of side-by-side belts trained around a series of rollers for either guiding or driving the apron. During field operation, crop material such as hay is picked up from the ground and continuously fed into the expandable chamber where it is rolled into a compact cylindrical package, wrapped with twine, net or the like and subsequently ejected onto the ground. During chamber expansion the apron belts move outwardly as the girth of the bale increases. Belt tension provides resistance against such outward movement and thereby is determinative of bale density.

Balers of the type mentioned above employ various systems for tensioning the apron during bale formation. For example, one successful arrangement is disclosed in U.S. Pat. No. 4,425,753, issued Jan. 17, 1984 in the name of John H. Freimuth, wherein a round baler having a bale forming chamber defined by sidewalls, an apron and a floor roll utilizes a pair of tension spring sets. Each set consists of four coil springs arranged in a diamond shaped pattern operatively mounted on one or the other of the sides of the baler frame to exert force on the apron assembly.

Other prior art round balers have used hydraulic systems in the tensioning systems. Illustrative of this is U.S. Pat. No. 4,698,955, issued Oct. 13, 1987 in the name of Robert A. Wagstaff, which discloses an expandable chamber round baler in which single acting hydraulic cylinders maintain force on a pivotal chamber wall comprising a plurality of rollers.

Air spring assemblies have also been used in prior art baler systems for maintaining a predetermined amount of tension on the apron during bale formation to control the density, as shown in U.S. Pat. No. 4,748,801, issued Jun. 7, 1988 in the name of Ronald T. Sheehan, et al.

In another known prior art technique, springs and hydraulic cylinders are used in combination for apron tensioning, as taught in U. S. Pat. Nos. 4,391,187, issued Jul. 5, 1983 in the name of Richard W. Koning, et al, and 4,899,651, issued Feb. 13, 1990 in the name of H. Nevin Lausch. In these systems a pair of springs and a pair of hydraulic cylinders are separately connected between the baler sides and an apron take up mechanism that moves as the girth of the bale being formed increases.

Although prior art round baler apron tensioning systems have met with varying degrees of success, there is always a need for a less complicated and inexpensive system that enhances the overall operation of round balers by improving performance and reliability of the machine.

SUMMARY OF THE INVENTION

An important object of the present invention is to provide an improved round baler apron tensioning system and thereby enhance overall baler performance.

In pursuance of this and other important objects the present invention provides an improvement for round balers that have a main frame, a tailgate pivotally connected to the main frame, a bale forming chamber defined by inwardly facing surfaces of crop conveying means which include an apron comprising a plurality of side by side belts trained around a series of transverse guide rolls mounted in the main frame and tailgate, and means for feeding crop material into the chamber. The bale forming chamber expands from a bale starting position to a completed bale position as crop material is fed into the chamber and conveyed by the conveying means in a generally spiral path to form a bale of increasing girth. A pair of apron take up arms are rotatably mounted on the main frame, and at least one additional transverse guide roll extends between the take up arms, about which additional guide roll the belts are also trained. Connected to rotate with the take up arms is a lever with tension means attached thereto for maintaining tension on the apron as the bale forming chamber expands. The improvement contemplated comprises tension means that have first and second resilient elements mounted in tandem to apply force to the lever opposite to the force on the take up arms as the bale girth increases.

DESCRIPTION OF THE DRAWINGS

FIGS. 3 to 5 are diagrammatic views of the tensioning elements of the present invention in three different conditions that exist during operation.

DESCRIPTION OF THE PREFERRED EMBODIMENT

Figure 1:
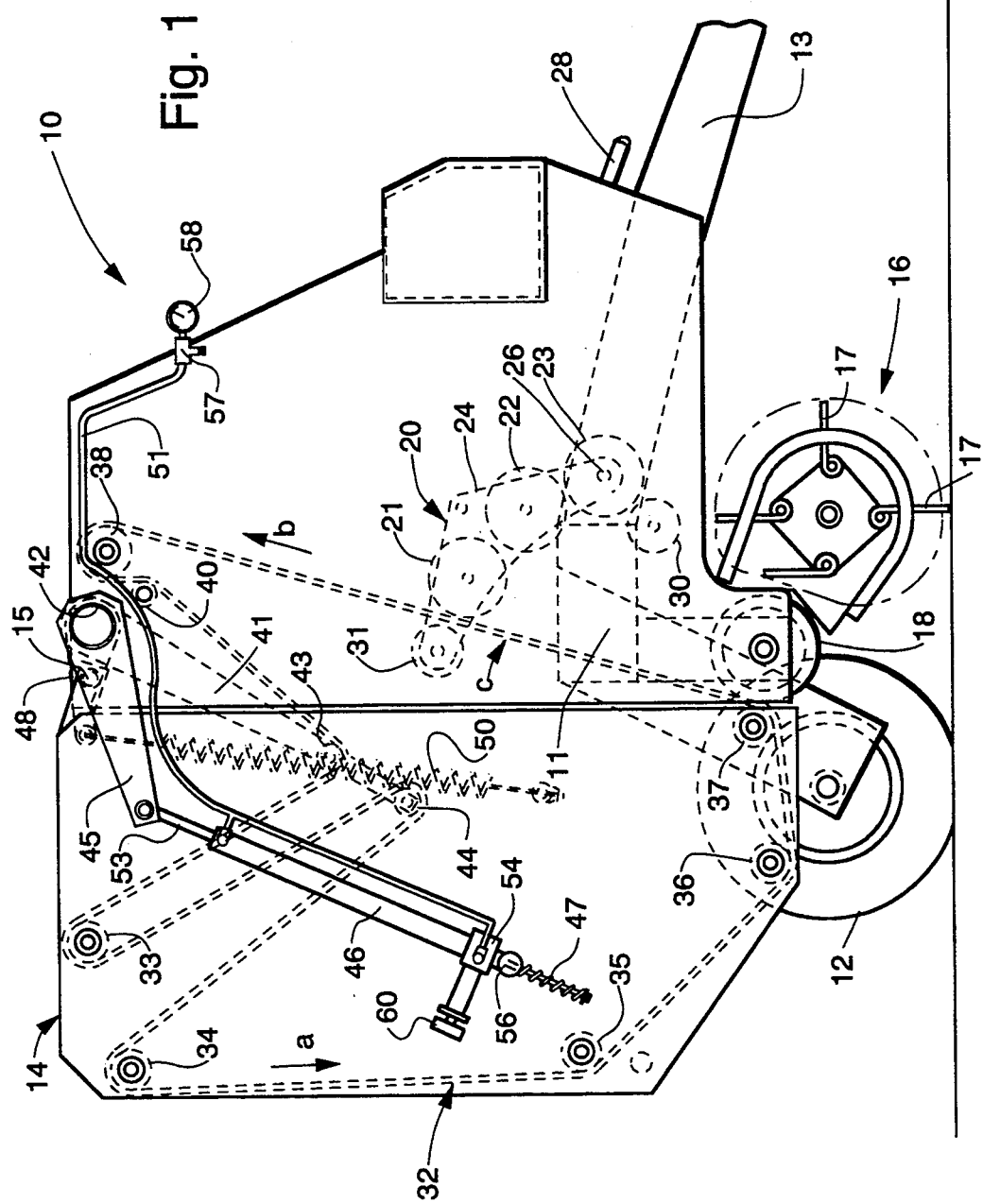
FIG. 1 is a diagrammatic side elevational view of a round baler in which the present invention is embodied.

Referring to the drawings, FIG. 1 shows a round baler 10 having an expandable chamber defined by belts and rollers, of the type disclosed in U.S. Pat. No. 4,870,812, issued Oct. 12, 1989 in the name of Richard E. Jennings, et al.

Figure 2:
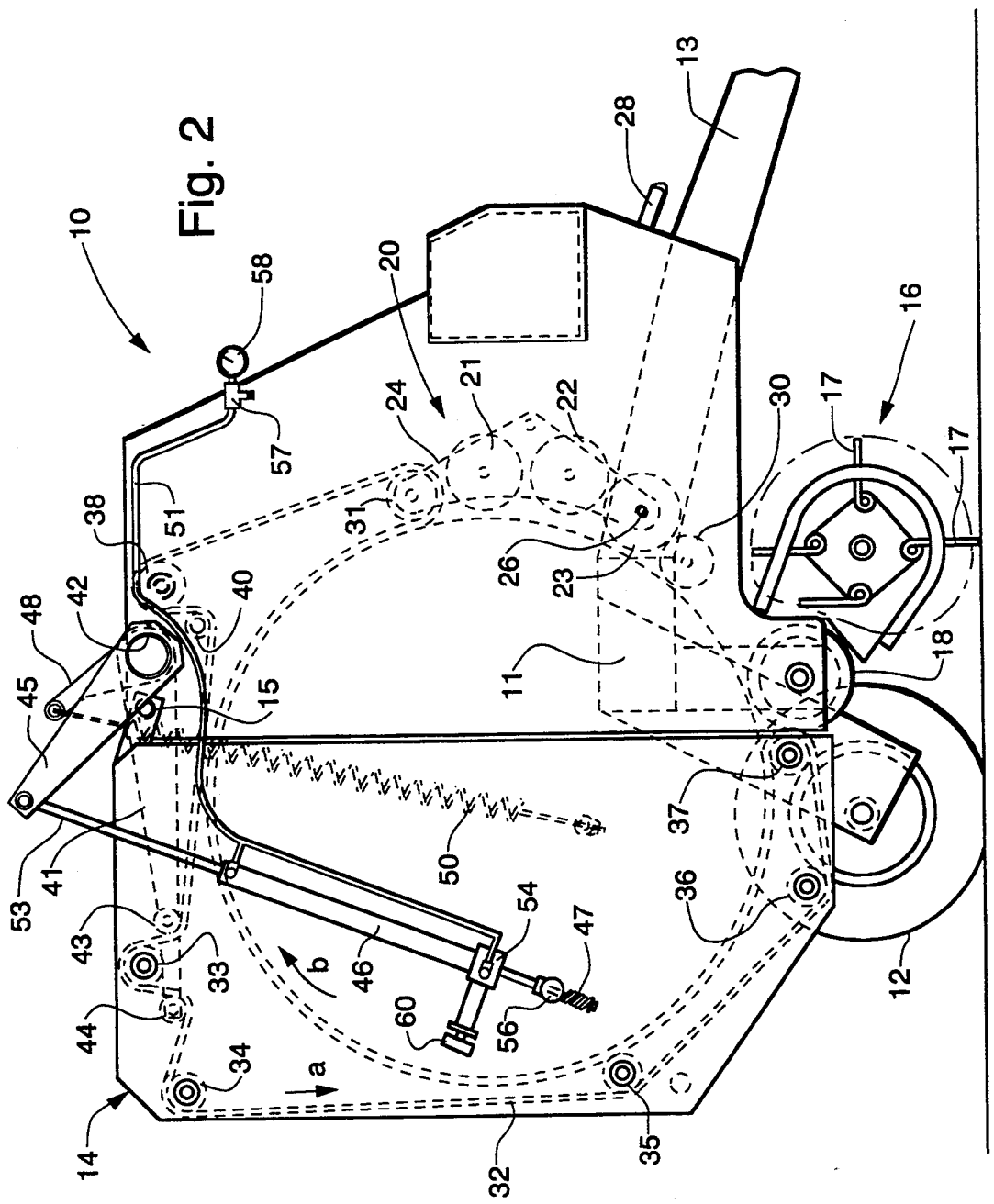
FIG. 2 is a diagrammatic side elevational view of the round baler shown in FIG. 1 in which the bale forming chamber has been changed from bale starting position to the full bale position.

Round baler 10, which incorporates the preferred embodiment of the present invention, includes a main frame 11 supported by a pair of wheels 12 (only one shown). A tongue 13 is provided for connection to a tractor. Pivotally connected to the sides of main frame 11 by a pair of stub shafts 15 is tailgate 14 which may be closed (as shown in FIGS. 1 and 2) during bale formation or pivoted open about stub shafts 15 to discharge a completed bale. A conventional pickup 16, mounted on main frame 11, includes a plurality of tines 17 movable in a predetermined path to lift crop material from the ground and deliver it rearwardly toward a rotatably mounted floor roll 18.

A chamber for forming bales is defined partly by a sledge assembly 20 comprising a plurality of rollers 21, 22, 23 extending transversely in the arcuate arrangement shown in FIGS. 1 and 2. Rollers 21, 22, 23 are journalled at their ends in a pair of spaced apart arms 24, one of which is shown. These arms are pivotally mounted inside main frame 11 on stub shafts 26 for providing movement of sledge assembly 20 between the bale starting position shown in FIG. 1 and the full bale position shown in FIG. 2. Rollers 21, 22, 23 are driven in a counter-clockwise direction by conventional means coupled to a drive shaft 28. A freely rotatable idler roller 31 is also carried by arms 24. Additionally, a starter roll 30, located adjacent roller 23, is also driven counter-clockwise.

The bale forming chamber is further defined by an apron 32 comprising a plurality of continuous side-by-side belts supported by guide rolls 33, 34, 35, 36, 37 rotatably mounted in tailgate 14 and a drive roll 38, mounted on main frame 11. Apron 32 passes between roller 21 on sledge assembly 20 and idler roller 31, and is in engagement only with idler roller 31 and not roller 21 which is located in close proximity to the apron belts to strip crop material from the belts, in addition to its bale forming function. Drive shaft 28 is also coupled to drive roll 38 which moves apron 32 along its changing path, indicated generally by arrows a and b in FIGS. 1 and 2. An additional guide roll 40 ensures proper driving engagement between apron 32 and drive roll 38. A pair of take up arms 41 (only one shown) are mounted to pivot conjointly with a cross shaft 42 between inner and outer positions shown in FIGS. 1 and 2, respectively. Belt tension lever arm 45 is also affixed to shaft 42 to pivot with take up arms 41, which carry additional guide rolls 43, 44 for supporting apron 32. A hydraulic cylinder 46 and cooperating tandemly mounted spring 47 are mounted on tail gate 14 and normally urge lever arm 45 and take up arms 41 toward their inner positions (FIG. 1). A second belt tension lever arm 48 is mounted on the opposite end of shaft 42 and rotates with lever arm 45 and take up arms 41. A second spring 50 is secured between the opposite side of baler 10 and lever arm 48 to also urge shaft 45 in a counter clockwise direction.

When the elements of round baler 10 are disposed as shown in FIG. 1 with tailgate 14 closed, an inner course c of apron 32 extends between guide roll 37 and idler roll 31. Rollers 21, 22, 23 are inclined rearwardly on sledge assembly 20 to define with course c the bale core starting chamber. Apron inner course c forms the rear wall of the chamber while the inwardly facing peripheral surfaces of rollers 21, 22, 23 define in a general manner a rearwardly inclined opposing front wall. Floor roll 18 defines the bottom of the chamber and starter roller 30, spaced from floor roll 18, provides an inlet for crop material.

As round baler 10 is towed across a field, pickup tines 17 lift crop material from the ground and deliver it through the inlet. The crop material is carried rearwardly by floor roll 18 into engagement with apron inner course c (FIG. 1) which urges it upwardly and slightly forwardly into engagement with rollers 21, 22, 23. In this manner crop material is coiled in a clockwise direction to start a bale core. Continued feeding of crop material into the bale forming chamber by pickup tines 17 causes the apron inner course c to expand in length as the girth of the bale being formed increases. Take up arms 41 rotate with lever arm 45 from their inner positions shown in FIG. 1 toward their outer positions shown in FIG. 2 to provide for expansion of the inner course of the apron in a well known manner, i.e., in effect the outer course of the belts of apron 32 is diminished in length while the inner course increases a like amount. After a bale has been formed and wrapped, tailgate 14 is opened and the bale is ejected rearwardly, as shown in U.S. Pat. No. 4,870,812, mentioned above, hereby incorporated by reference. Subsequent closing of tailgate 14 returns the inner and outer courses of the belts of apron 32 to the locations shown in FIG. 1.

During bale formation, sledge assembly 20 moves from its corresponding bale starting position (FIG. 1) to its full bale position (FIG. 2). This causes idler roller 31 to move along an arcuate path while maintaining apron 32 in close proximity to roller 21, thereby allowing roller 21 to strip crop material from the belts of apron 32 and prevent or reduce significantly the loss of crop material between roller 21 and apron 32 during formation of a bale. Thus, in effect, sledge assembly 20 is pushed outwardly during bale formation as the crop material expands against rollers 21, 22, 23 and then subsequently is pulled inwardly by apron 32 to the position shown in FIG. 1 during bale ejection.

Now turning to FIGS. 3-5 to describe in further detail the novel tensioning system at the heart of the present invention, the elements are shown in the empty chamber condition in FIG. 3, the completed bale condition in FIG. 4, and an intermediate condition in FIG. 5. The hydraulic system includes a hose 51 supplying fluid to both sides of a piston 52 mounted on a rod 53 in cylinder 46, and an adjustable relief valve 54 with a return free flow check. Affixed in tandem with cylinder 46 is spring 47 mounted on a rod 55 secured to and axially aligned with cylinder 46. Rod 55 extends through a hole in mounting pin 56 attached to and extending from the side of the baler for mounting the spring and cylinder tensioning combination in a position that permits rod 53 to operatively engage lever arm 45.

Referring now to FIGS. 1 and 2, hydraulic fluid is supplied to cylinder 46 from a source (not shown) via a tee fitting 57, which also accommodates a pressure gauge 58. Fluid is pressured from the rod end of cylinder 46 to the base end via valve 54 which is provided with a control handle 60 for setting relief pressure at varying levels that correspond to desired tension on the apron. Valve 54 is also provided with a free flow one way check that forces fluid to the rod end when the take up arms 42 return to the empty bale forming chamber condition following discharge of a bale from the chamber.

In operation, control handle 60 is used to set the desired tension on apron 32 by observing the pressure indicated on gauge 58 as control 60 is adjusted. This adjusts bale density by varying the force that must be overcome by takeup arms 41 as the girth increases during bale formation. Initially, spring 47 is under partial compression and piston 52 is in the position shown in FIG. 3 with no flow through valve 54. Additionally, spring 50 (FIG. 1) is under tension applying supplemental apron tensioning force to take up arms 41 via lever 48.

As a bale begins to form in the chamber, spring 47 is compressed to its solid height condition against mounting pin 56, as shown in FIG. 4, before piston 52 moves from the position shown in FIG. 3. Thus, during initial core formation tension on the apron is applied by spring 47 and spring 50. After spring 47 becomes fully compressed and as the bale girth continues to increase against the apron, pressure in the hydraulic circuit reaches the set level of the relief valve, piston 52 moves to the position shown in FIG. 4, and spring 50 extends (FIG. 2) as a result of rotation of lever 48.

After the bale has attained its desired girth and the conveyance of crop material is interrupted, the belts continue to rotate the bale in the chamber during wrapping in a well known manner, e.g., twine is wrapped spirally around the turning bale by feeding it through the inlet defined by floor roll 18 and starter roll 30. During this wrapping function it is not uncommon for the bale girth to diminish due to the continuous bale rotation which in turn could cause the belt friction to reduced resulting in slippage between the completed bale and the apron. When this occurs the wrapping operation is detrimentally affected or even interrupted and in extreme cases the bale could heat up to a dangerously high temperature level. The present invention obviates this problem by maintaining tension on the apron when shrinkage occurs by virtue of the force of spring 47 which attempts to return to its semi compressed condition from the solid height compressed condition. When this occurs, piston 52 remains in the full bale position shown in FIGS. 4 and 5 while spring 46 goes to the condition shown in FIG. 5 resulting in lever 45 and consequently take up arms 41 to be urged in a clockwise direction which accordingly takes up this undesirable belt slack and maintains the desired tension on the apron and thereby prevents belt slippage.

While preferred structure in which the principles of the present invention have been incorporated is shown and described above, it is to be understood that the invention is not limited to such structure, but that, in fact, widely different means of varying scope and configuration may be employed in the practice of the invention.

Having thus described the invention, what is claimed is:

1. In a round baler having
   a main frame,
   a tailgate pivotally connected to said main frame,
   a bale forming chamber defined by inwardly facing surfaces of crop conveying means which includes an apron comprising a plurality of side by side belts trained around a series of transverse guide rolls mounted in said main frame and said tailgate,
   means for feeding crop material into said chamber,
   said bale forming chamber expanding from a bale starting position to a completed bale position as crop material is fed into said chamber and conveyed by said conveying means in a generally spiral path to form a bale of increasing girth,
   a pair of apron take up arms rotatably mounted on said main frame,
   at least one additional transverse guide roll extending between said take up arms and about which additional guide roll said belts are also trained,
   a lever connected to rotate with said take up arms, and
   tension means attached to said lever for maintaining tension on said apron as said bale forming chamber expands, the improvement comprising
   said tension means having first and second resilient elements mounted in tandem to apply force to said lever opposite to the force on said take up arms as said bale girth increases.

2. A round baler as set forth in claim 1 wherein said first resilient element comprises a hydraulic cylinder.

3. A round baler as set forth in claim 1 wherein said second resilient element comprises a spring.

4. A round baler as set forth in claim 3 wherein said first resilient element comprises a hydraulic cylinder.

5. A round baler as set forth in claim 3 wherein said spring is under tension under conditions where said bale forming chamber is in said bale starting position.

6. A round baler as set forth in claim 5 wherein said spring tension is initially diminished as said bale begins to form and subsequently said spring is under compression until said bale is completed.

7. A round baler as set forth in claim 6 wherein said first resilient element comprises a hydraulic cylinder, and wherein said improvement further comprises hydraulic circuit means for setting the pressure in said hydraulic cylinder to control the force applied to said lever by said hydraulic cylinder.

8. A round baler as set forth in claim 7 wherein said hydraulic pressure is set to provide a force that exceeds the force applied by said spring under said bale starting conditions.

9. A round baler as set forth in claim 1 wherein a second lever is connected to rotate with said take up arms and additional tension means are attached to said second lever for maintaining tension on said apron as said bale forming chamber expands.

10. A round baler as set forth in claim 9 wherein said additional tension means comprise a second spring.

* * * * *